No. 663,823. Patented Dec. 11, 1900.
W. WEBBER.
MEANS FOR CONNECTING VENDING MACHINES TO METERS.
(Application filed July 2, 1900.)
(No Model.)
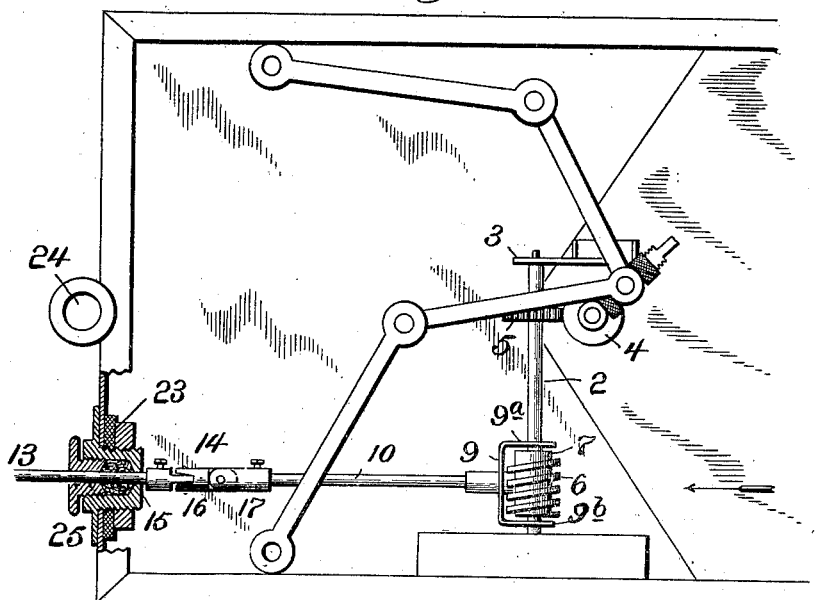
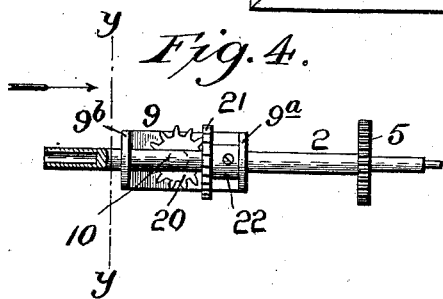
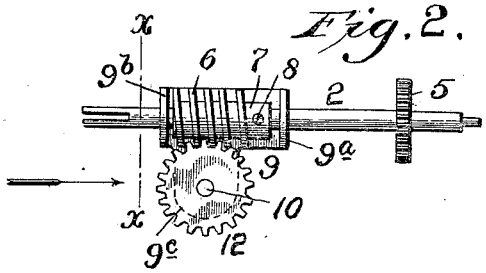
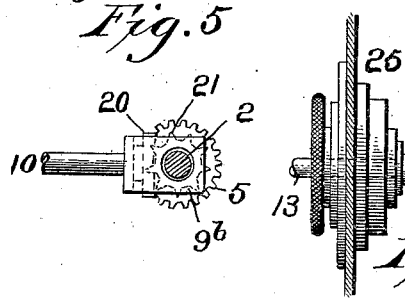
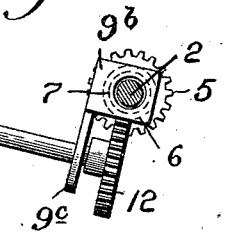
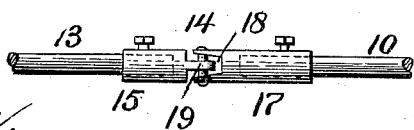
Witnesses:
J. B. McGirr
Emil Rieser
Inventor:
Wesley Webber
By H. A. West
Attorney

UNITED STATES PATENT OFFICE.

WESLEY WEBBER, OF NEW YORK, N. Y.

MEANS FOR CONNECTING VENDING-MACHINES TO METERS.

SPECIFICATION forming part of Letters Patent No. 663,823, dated December 11, 1900.

Application filed July 2, 1900. Serial No. 22,318. (No model.)

*To all whom it may concern:*

Be it known that I, WESLEY WEBBER, a citizen of the United States, and a resident of No. 6 Wall street, in the borough of Manhattan, in the city of New York, in the county of New York and State of New York, have invented certain new and useful Improvements in Means of Connecting Vending-Machines to Meters, of which the following is a specification.

In providing coin-controlled gas-vending machines for universal application to ready-made gas-meters, whether of the same or different makes, there are certain distances or measurements which the gas-vending machine must accommodate itself to in each meter which are not constant throughout meters as made by various manufacturers or even throughout meters of the same make—for instance, the vertical distance between the top of the inlet-port of the meter and the axis of the "two-foot shaft" or "proving-head" axle of the meter-index and the horizontal distances between the two-foot shaft and the side of the meter and between the axis of the inlet-pipe and the front of the meter.

In order to transmit motion from the registering mechanism of the meter proper to the counting and valve-closing mechanism of the vending-machine, it is difficult and expensive to aline a fixed bearing in meters of various makes having varying distances and dimensions with a fixed bearing in a standard-made vending-machine.

In my pending application for a United States patent, Serial No. 729,580, filed September 6, 1899, and in my United States Patents Nos. 591,514 and 591,515, issued October 12, 1897, I have illustrated several methods of making an easily-adjustable connection between the meter mechanism and the vending mechanism, which is shown in Figures 1, 2, and 11 of said pending application and in Fig. 16 of said Patent No. 591,514 and in Figs. 2 and 23 of said Patent No. 591,515. For instance, in one of said devices the oscillation of the flag-arm of the meter is utilized to intermittently rotate a ratchet-wheel journaled in the vending mechanism or in the side of the meter. The center of this ratchet-wheel is located by and in sole reference to the construction of the vending mechanism, and the variations in distance between the actuating-pawl of the ratchet-wheel and the flag-arm are easily adjusted for in the various constructions shown; but to adjust this very adjustment so that each oscillation of the flag-arm shall make one tooth of the ratchet-wheel, no more and no less, requires some nicety and accuracy of manipulation on the part of the mechanic in the operation of attaching the vending mechanism to the meter, to obviate which necessity I prefer to employ a wheel that shall be in continuous gear with some rotating part of the meter proper. To do this calls for a bearing located in the meter and with reference to the dimensions and distances of both the meter and the vending-machine. I meet this demand by employing a swinging journal-bearing frame adapted to be adjustably located in the meter, in which frame is journaled a telescopic shaft or shaft of adjustable length, which shaft is provided with a flexible or universal joint. The adjustable location of this frame, the freedom of the shaft to take off at any angle to its actuating part, and the adjustable length of the shaft enable the mechanic in performing the labor of attaching the machine to a ready-made meter to meet with ease, simplicity, and economy the varying conditions imposed by the varying dimensions and distances of the various meters to which it may be desired to affix the vending-machine and enable all the attaching or connecting parts to be made of standard patterns and sizes.

In the accompanying drawings, which form a part of this specification and to which reference is hereby made, Fig. 1 is a plan view of the attic of an ordinary dry gas-meter with the top removed, showing in plan and sectional plan one form of my invention. Fig. 2 is a detail elevation of the two-foot shaft and parts connected thereto and the worm-wheel viewed in the direction of the arrow in Fig. 1. Fig. 3 is another detail elevation of the same seen from the front of the meter—*i. e.*, in the direction of the arrow in Fig. 2—showing the index or two-foot shaft of the meter in section on the line $xx$ of Fig. 2 and showing the construction and action of the swinging bearing, counter-shaft, and universal joint. Figs. 4 and 5 are detail elevations, the former viewed in the direction of the arrow shown in Fig. 1 and the latter in the direction of the arrow shown in Fig. 4—i. e., from the front of the meter—of a modification of means of transmitting motion from the index-shaft of the meter to the vending mechanism, Fig. 5 showing the index-shaft in section on the line y y of Fig. 4; and Fig. 6 is a detail elevation of the modification of the universal joint.

In the drawings, 2 represents the index-shaft, two-foot shaft, or proving-head axle of the ordinary dry gas-meter, which, as meters are commonly constructed, is journaled at one end in a flexible bracket 3 and slotted at the opposite end to connect with a shaft of the index-train in the usual way. It is rotated by the king-post worm 4, which meshes with the gear-wheel 5, secured on the shaft. Upon this shaft is placed a worm 6, formed as a part of the hollow sleeve 7 and held in place by set-screw 8. There is also placed upon this shaft a frame 9, provided with aperturered brackets 9$^a$, 9$^b$, and 9$^c$. The brackets 9$^a$ and 9$^b$ span the worm 6 and its tubular sleeve 7 and loosely support the frame upon the two-foot shaft 2. The bracket 9$^c$ forms the journal or bearing for one end of a counter-shaft 10, to which is connected a worm-gear 12, which meshes with the worm 6. It will be noticed from Fig. 3 that the bracket 9$^c$ is held in approximately vertical position by the counter-shaft 10, and being offset from and its plane being parallel to the axis of shaft 2 the counter-shaft 10, while always at right angles to shaft 2, may transmit motion from shaft 2 at any angle to the horizontal gear-wheel 12, remaining always in mesh with worm 6.

The counter-shaft 10 is connected to the actuating-shaft 13 of the vending-machine by a universal or flexible joint 14. In the form shown in Fig. 1 this flexible joint comprises three sections 15, 16, and 17, the two outer sections 15 and 17 of which telescope, respectively, with the inner end of shaft 13 and the outer end of counter-shaft 10, suitable set screws or nuts being provided to fasten them in proper adjustment. The central section 16 is a link with a pivot at each end, the pivots being at right angles to each other, as shown in Fig. 1. The central section 16, however, need not be used unless the slant of the counter-shaft 10 is excessive, as, perhaps, in meters of very large size, where the vertical distance from the center of shaft 13 to the center of wheel 12 would be great. In the meters ordinarily used in domestic consumption of gas the simpler and less expensive form of joint (shown in Figs. 3 and 6) may be employed. In this simpler form the notch 18 of section 17 is of such width relatively to the tongue 19 of the section 15 that when the single pin or pivot employed is approximately vertical, as shown in Fig. 3, there will be no friction or binding between the tongue 19 and either side of the notch 18.

In Figs. 4 and 5 I have shown a modification for transmitting the motion of the two-foot shaft 2 to the counter-shaft 10, which is adapted to deliver much smaller quantities of gas in exchange for a coin than the arrangement shown in Figs. 1 to 3. In Figs. 1 to 3 the gear-wheel 12, having, for example, twenty teeth, as shown, will represent in one complete revolution twenty times the amount of gas represented by one revolution of shaft 2—for example, in the construction shown with a two-foot index-shaft forty feet, while in the construction shown in Figs. 4 and 5 one revolution of the counter-shaft 10 will represent only two feet, and by doubling the number of teeth on one or the other of the two gear-wheels may represent one or four feet. Thus without changing the gear or general plan of the vending-machine a standard machine may be employed for delivering gas in exchange for coins of different denominations.

In the form shown in Figs. 4 and 5 the frame 9 is not provided with the bracket 9$^c$; but the counter-shaft 10 is journaled in an aperture at the center of the frame and is provided with a counter gear-wheel 20, held in mesh at right angles with another gear-wheel 21, which is mounted upon a tubular boss or sleeve 22, which is secured by a set-screw to the two-foot shaft 2. The frame 9 while loose on the shaft 2 is held from sliding too far in one direction by the boss 22 and in the other direction by the contact of wheel 20 with wheel 21.

The aperture 23 for the stuffing-box in the side of the meter is made a certain and constant distance below and to the front of the top of the inlet-port 24 of the meter, and its position is determined solely with reference to the standard construction of the vending-machine. No matter what the elevation of the top of the inlet-port 24 above the two-foot shaft 2 may be its variations in various meters are taken up by the varying angle assumed by the flexible joint and the varying angles of the swinging frame 9 and counter-shaft 10 to the horizontal. The varying horizontal distances between the stuffing-box 25 and the two-foot shaft are allowed for by the telescoping of shafts 13 and 10 in the tubular sections of the flexible connection 14 before fixing the shafts 13 and 10 in the sections with the set screws or nuts. The varying horizontal distances between the shaft 13 and the front of the meter are allowed for by adjusting the frame 9 and its contained worm or gear wheel, as the case may be, along the two-foot shaft 2 before fastening with the set-screw 8 or the similar set-screw shown in Fig. 4.

Having thus described my invention, what I claim as new, and desire to secure by Letters Patent, is—

1. As a means of connecting coin-controlled gas-vending mechanism to meters and the registering mechanism thereof, in combination with the actuating-shaft of the index of the meter and the driving-shaft of the vending machine, a swinging frame adjustable upon the meter-index shaft, and adjustable transmitting-gear applied to said shaft, a counter-shaft geared to said transmitting-gear and journaled in said swinging frame, and a flexible joint connecting said counter-shaft with the driving-shaft of the vending-machine; substantially as described.

2. As a means of connecting coin-controlled gas-vending mechanism to meters and the registering mechanism thereof, in combination with the actuating-shaft of the index of the meter and the driving-shaft of the vending-machine, a swinging frame adjustable upon the meter-index shaft, and adjustable transmitting-gear applied to said shaft, a counter-shaft geared to said transmitting-gear and journaled in said swinging frame, and a longitudinally-adjustable flexible joint connecting said counter-shaft with the driving-shaft of the vending-machine; substantially as described.

Signed at New York, in the county of New York and State of New York, this 30th day of June, A. D. 1900.

WESLEY WEBBER.

Witnesses:
 LEWIS S. BURCHARD,
 EMILE RIESER.